(12) United States Patent
Zhang (10) Patent No.: US 10,912,081 B2
(45) Date of Patent: Feb. 2, 2021

(54) METHOD AND DEVICE USED FOR WIRELESS COMMUNICATION IN UE AND BASE STATION

(71) Applicant: Shanghai Langbo Communication Technology Company Limited, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 220 days.

(21) Appl. No.: 15/972,167

(22) Filed: May 6, 2018

(65) Prior Publication Data

US 2018/0324798 A1   Nov. 8, 2018

(30) Foreign Application Priority Data

May 8, 2017   (CN) .......................... 2017 1 0318202

(51) Int. Cl.
*H04W 72/04*   (2009.01)
*H04W 24/02*   (2009.01)
(Continued)

(52) U.S. Cl.
CPC ...... *H04W 72/0446* (2013.01); *H04B 7/0617* (2013.01); *H04L 5/0023* (2013.01);
(Continued)

(58) Field of Classification Search
CPC ............... H04W 24/02; H04W 72/042; H04W 72/0446; H04L 5/0023; H04L 27/2602;
(Continued)

(56) References Cited

U.S. PATENT DOCUMENTS

2015/0124736 A1   5/2015   Ko et al.
2018/0083680 A1*  3/2018   Guo .................... H04B 7/0626

FOREIGN PATENT DOCUMENTS

CN   101771437 A   7/2010
CN   106550445 A   3/2017

OTHER PUBLICATIONS

CN Search Report in application No. 201710318202.4 dated Feb. 13, 2020.
(Continued)

*Primary Examiner* — Mandish K Randhawa
(74) *Attorney, Agent, or Firm* — Maschoff Brennan (57) ABSTRACT

The present disclosure provides a method and a device used for wireless communication in a base station and a User Equipment (UE). The UE receives a first radio signal, wherein the first radio signal is transmitted within a first time unit, a first bit block is used for generating the first radio signal, and the first radio signal comprises G multicarrier symbols. As for any one given multicarrier symbol of the G multicarrier symbols, the multi-antenna related receiving for the given multicarrier symbol is related to the relative position of a time-domain resource occupied by the given multicarrier symbol with respect to a first time point in time domain. The first time point is one time point within the first time unit. The present disclosure increases the dynamic of the multi-antenna related receiving.

12 Claims, 6 Drawing Sheets

(51) Int. Cl.
  *H04L 5/00* (2006.01)
  *H04L 27/26* (2006.01)
  *H04B 7/06* (2006.01)
  *H04B 7/08* (2006.01)

(52) U.S. Cl.
  CPC ......... *H04L 27/2602* (2013.01); *H04W 24/02* (2013.01); *H04W 72/042* (2013.01); *H04B 7/0695* (2013.01); *H04B 7/088* (2013.01); *H04L 5/001* (2013.01)

(58) Field of Classification Search
  CPC ..... H04L 5/001; H04B 7/0617; H04B 7/0695; H04B 7/088
  See application file for complete search history.

(56) References Cited

OTHER PUBLICATIONS

CN Office Action in Application No. 201710318202.4 dated Feb. 26, 2020.
CN Notice of Granting Patent Right in Application No. 201710318202.4 dated Apr. 28, 2020.

\* cited by examiner

METHOD AND DEVICE USED FOR WIRELESS COMMUNICATION IN UE AND BASE STATION

CROSS REFERENCE TO RELATED DISCLOSURE

This disclosure claims the priority benefit of Chinese Patent Application 201710318202.4, filed on May 8, 2017, all of which is incorporated herein by reference.

BACKGROUND

Technical Field

The present disclosure relates to transmission schemes of radio signals in wireless communication systems, and in particular to a method and a device for multi-antenna transmission.

Related Art

Massive Multi-Input Multi-Output (MIMO) becomes one research hotspot of next-generation mobile communications. In the massive MIMO, multiple antennas experience beamforming to form a relatively narrow beam which points to a particular direction to improve the quality of communication. The massive MIMO can also form different directions through multiple antennas to serve multiple users simultaneously, thereby forming Multi-User MIMO (MU-MIMO), and thus improving the throughput of the massive MIMO system and reducing the delay of transmission.

In 3GPP New Radio discussion, there is some company proposing to increase the robustness of transmission using a relatively wide beam transmitting Physical Downlink Control Channel (PDCCH) and to increase the Signal-to-Noise Ratio (SNR) using a relatively narrow beam transmitting Physical Downlink Shared Channel (PDSCH). There is also some company proposing to use the PDCCH to cross-slot indicate the transmission beam of the PDSCH, so as to solve the problem of delay between a User Equipment (UE) acquiring the transmission beam of the PDSCH from the PDCCH and conducting PDSCH receiving using the beam information indicated by the PDCCH.

SUMMARY

In one embodiment, the inventor finds through research that cross-slot beam indication would result in reduction of dynamic of beam information, increase of overhead of control signaling, reduction of dynamic of scheduling, and other problems. A UE with high processing capacity can decode the PDCCH in a short time to obtain beam information that is used for receiving the PDSCH that is in the time slot of the PDCCH, and adjust a receiving beam to receive a multicarrier symbol in which the PDSCH is located. However, the delay in PDSCH transmission caused by decoding PDCCH would result in underutilization of system resources.

In view of the above problems, the present disclosure provides a solution. It should be noted that the embodiments of the present disclosure and the characteristics in the embodiments may be mutually combined if there is no conflict. For example, the embodiments of the base station of the present disclosure and the characteristics in the embodiments may be applied to the UE, and vice versa.

The present disclosure discloses a method in a UE used for wireless communication. The method includes the following steps:

receiving a first radio signal.

Herein, the first radio signal is transmitted within a first time unit, a first bit block is used for generating the first radio signal, and the first radio signal includes G multicarrier symbols. As for any one given multicarrier symbol of the G multicarrier symbols, the multi-antenna related receiving for the given multicarrier symbol is related to the relative position of a time-domain resource occupied by the given multicarrier symbol with respect to a first time point in time domain. The first time point is one time point within the first time unit. G is a positive integer.

In one embodiment, the above method is advantageous in that the multi-antenna related receiving for the first radio signal is configured flexibly according to the delay requirements of multi-antenna related receiving.

In one embodiment, the first radio signal is a PDSCH.

In one embodiment, the first radio signal is a consecutive data transmission block in time domain.

In one embodiment, the first radio signal is G consecutive multicarrier symbols in time domain.

In one embodiment, the first time unit is a subframe.

In one embodiment, the subframe includes 14 Orthogonal Frequency Division Multiplexing (OFDM) symbols.

In one embodiment, the first time unit is a time slot.

In one embodiment, the time slot includes 7 OFDM symbols.

In one embodiment, the first time unit is a Transmission Time Interval (TTI).

In one embodiment, the first time unit only includes a Downlink Control Information (DCI) that is used for indicating downlink assignment.

In one embodiment, all bits in the first bit block are used for generating the first radio signal.

In one embodiment, partial bits in the first bit block are used for generating the first radio signal.

In one embodiment, the first bit block is a transmission block.

In one embodiment, the first bit block is subjected to steps of Circular Redundancy Check (CRC) addition, segmentation, channel coding, rate matching, scrambling, modulation, antenna mapping to form the first radio signal.

In one embodiment, the first bit block is a subblock in a transmission block.

In one embodiment, the first bit block is one of the multiple bit subblocks that are formed after one transmission block is added with CRC and is segmented.

In one embodiment, the first bit block is subjected to steps of channel coding, rate matching, scrambling, modulation and antenna mapping to form the first radio signal.

In one embodiment, multiple bit blocks are one-to-one corresponding to multiple layers of signals in the first radio signal, and the first bit block is one of the multiple bit blocks.

In one embodiment, the multicarrier symbol is an OFDM symbol.

In one embodiment, the multicarrier symbol is a Filter Bank Multiple Carrier (FBMC) symbol.

In one embodiment, the multi-antenna related receiving refers to an analog receiving beam.

In one embodiment, the multi-antenna related receiving refers to a transmitting antenna port assumed by the UE.

In one embodiment, the G multicarrier symbols are G consecutive multicarrier symbols.

In one embodiment, the first radio signal consists of G multicarrier symbols.

In one embodiment, the first radio signal includes a multicarrier symbol not in the G multicarrier symbols.

In one embodiment, if the given multicarrier symbol is before the first time point in time domain, a first multi-antenna receiving mode is employed for the multi-antenna related receiving of the given multicarrier symbol; if the given multicarrier symbol is behind the first time point in time domain, a second multi-antenna receiving mode is employed for the multi-antenna related receiving of the given multicarrier symbol. The first multi-antenna receiving mode differs from the second multi-antenna receiving mode.

In one embodiment, the first multi-antenna receiving mode and the second multi-antenna receiving mode use different analog beams to receive, respectively.

In one embodiment, the first multi-antenna receiving mode and the second multi-antenna receiving mode assume different transmitting antenna ports to transmit, respectively.

In one embodiment, the antenna receiving gain corresponding to the second multi-antenna receiving mode is greater than the antenna receiving gain corresponding to the first multi-antenna receiving mode.

In one embodiment, the transmission reliability corresponding to the first multi-antenna receiving mode is greater than the transmission reliability corresponding to the second multi-antenna receiving mode.

In one embodiment, the second multi-antenna receiving mode uses a beam narrower than that of the first multi-antenna receiving mode.

In one embodiment, the G multicarrier symbols are all before the first time point in time domain, and the multi-antenna related receiving for the G multicarrier symbols is the same.

In one embodiment, the G multicarrier symbols are all behind the first time point in time domain, and the multi-antenna related receiving for the G multicarrier symbols is the same.

In one embodiment, G1 multicarrier symbols of the G multicarrier symbols are before the first time point in time domain, G2 multicarrier symbols of the G multicarrier symbols are behind the first time point in time domain, the multi-antenna related receiving for the G1 multicarrier symbols is the same, the multi-antenna related receiving for the G2 multicarrier symbols is the same, the multi-antenna related receiving for the G1 multicarrier symbols and the multi-antenna related receiving for the G2 multicarrier symbols are different. G1 and G2 are positive integers.

In one embodiment, the first time point is an index value of one multicarrier symbol within the first time unit.

According to one aspect of the present disclosure, the method includes the following steps:

receiving a second radio signal.

The second radio signal is transmitted within the first time unit, and the second radio signal is used for determining a time-domain resource occupied by the G multicarrier symbols.

In one embodiment, the above method is advantageous in that the time-domain resource occupied by the G multicarrier symbols is configured flexibly.

In one embodiment, the second radio signal is a PDCCH.

In one embodiment, the second radio signal is an Enhanced PDCCH (ePDCCH).

In one embodiment, the second radio signal indicates explicitly the time-domain resource occupied by the G multicarrier symbols In one embodiment, the second radio signal indicates implicitly the time-domain resource occupied by the G multicarrier symbols In one embodiment, the second radio signal is a DCI carrying downlink assignment.

In one embodiment, the first time unit is composed of N1 multicarrier symbols in which the second radio signal is located and N2 multicarrier symbols. N2 is not smaller than G. The second radio signal is used for determining the G multicarrier symbols of the N multicarrier symbols. N1 and N2 are positive integers.

In one embodiment, the first time unit is composed of N1 multicarrier symbols in which the second radio signal is located and G multicarrier symbols. The N1 multicarrier symbols are used for determining the G multicarrier symbols. N1 is a positive integer.

According to one aspect of the present disclosure, if the time-domain resource occupied by the given multicarrier symbol is behind the first time point, the second radio signal is used for determining the multi-antenna related receiving for the given multicarrier symbol; or, if the time-domain resource occupied by the given multicarrier symbol is before the first time point, the multi-antenna related receiving for the given multicarrier symbol is related to the multi-antenna related receiving for the second radio signal.

In one embodiment, the above method is advantageous in that the dynamic of the multi-antenna related receiving is increased.

In one embodiment, the above method is advantageous in that the delay in the receiving of the first radio signal resulted from the delay in the decoding of the second radio signal is avoided.

In one embodiment, the above method is advantageous in that, before the first time point, the PDSCH receives the multicarrier symbol of the PDSCH before the first time point using the same beam used for receiving the PDCCH, thereby avoiding the problem of the delay in PDSCH transmission resulted from the delay in PDCCH decoding.

In one embodiment, if the time-domain resource occupied by the given multicarrier symbol is behind the first time point, the second radio signal is used for determining the multi-antenna related receiving for the given multicarrier symbol; or, if the time-domain resource occupied by the given multicarrier symbol is before the first time point, the multi-antenna related receiving for the given multicarrier symbol is related to the multi-antenna related receiving for the second radio signal.

In one embodiment, the second radio signal indicates explicitly the multi-antenna related receiving for the given multicarrier symbol.

In one embodiment, the second radio signal indicates implicitly the multi-antenna related receiving for the given multicarrier symbol.

In one embodiment, the receiving beam for the given multicarrier symbol is the same as the receiving beam for the second radio signal.

In one embodiment, the assumed transmitting antenna port for the given multicarrier symbol is the same as the assumed transmitting antenna port for the second radio signal.

According to one aspect of the present disclosure, the multi-antenna related receiving refers to a corresponding beamforming vector used for receiving; or, the multi-antenna related receiving refers to a corresponding antenna port used for transmitting.

In one embodiment, the above method is advantageous in that the beam used for transmitting data is adjusted flexibly to improve the antenna array gain.

In one embodiment, the index value of the receiving beam is used for indicating the beamforming vector used for receiving.

In one embodiment, the index value of a first beam pair is used for indicating the beamforming vector used for receiving, and the first beam consists of a transmitting vector and a receiving vector.

In one embodiment, the beamforming vector is an analog beamforming vector.

In one embodiment, the beamforming vector is one beamforming vector consisting of an analog beamforming vector and a digital beamforming vector.

In one embodiment, the antenna port is formed by multiple physical antennas through antenna virtualization overlay. Mapping coefficients of the antenna port to the multiple physical antennas compose a beamforming vector, which is used for the antenna virtualization to form a beam.

In one embodiment, a first reference signal is transmitted through the antenna port used for transmitting, a small-scale channel parameter experienced by the first reference signal is used for determining the small-scale channel parameter experienced by the first radio signal, the first reference signal is indicated associated with a second reference signal, a big-scale channel parameter experienced by the second reference signal is used for determining the big-scale channel parameter experienced by the first radio signal.

In one subembodiment, the first reference signal is indicated Quasi Co-Located (QCL) with the second reference signal.

According to one aspect of the present disclosure, the method includes the following steps:

receiving first information.

The first information is used for determining the first time point.

In one embodiment, the above method is advantageous in that the first time point is configured flexibly according to the UE capability and system situations.

In one embodiment, the first information indicates explicitly the first time point.

In one embodiment, the first information indicates implicitly the first time point.

In one embodiment, the first time point is an index of one multicarrier symbol in the first time unit.

In one embodiment, the first information is a high-layer signaling.

In one embodiment, the first information is a Radio Resource Control (RRC) signaling.

According to one aspect of the present disclosure, the method includes the following steps:

transmitting second information.

The second information is used for determining the first time point.

In one embodiment, the above method is advantageous in that the UE can assist the base station to determine the first time point by indicating the processing capability of the UE to the base station, thereby optimizing the performance of the system.

In one embodiment, the second information indicates explicitly the first time point.

In one embodiment, the second information indicates implicitly the first time point.

In one embodiment, the second information is an RRC signaling.

In one embodiment, the second information is transmitted in a Message 3 in the random access process.

According to one aspect of the present disclosure, the method includes the following steps:

receiving third information.

The third information is used for determining a candidate scheme for the multi-antenna related receiving corresponding to the G multicarrier symbols.

In one embodiment, the above method is advantageous in that the candidate scheme for the multi-antenna related receiving corresponding to the G multicarrier symbols is configured flexibly.

In one embodiment, the third information indicates explicitly the candidate scheme for the multi-antenna related receiving corresponding to the G multicarrier symbols.

In one embodiment, the third information indicates implicitly the candidate scheme for the multi-antenna related receiving corresponding to the G multicarrier symbols.

In one embodiment, the candidate scheme for the multi-antenna related receiving corresponding to the G multicarrier symbols includes a first multi-antenna receiving mode and a second multi-antenna receiving mode. The first multi-antenna receiving mode differs from the second multi-antenna receiving mode. If the given multicarrier symbol is before the first time point in time domain, the first multi-antenna receiving mode is employed for the multi-antenna related receiving of the given multicarrier symbol; if the given multicarrier symbol is behind the first time point in time domain, the second multi-antenna receiving mode is employed for the multi-antenna related receiving of the given multicarrier symbol.

In one embodiment, the candidate scheme for the multi-antenna related receiving corresponding to the G multicarrier symbols includes multiple candidate beams used for receiving.

In one embodiment, the candidate scheme for the multi-antenna related receiving corresponding to the G multicarrier symbols includes multiple candidate beamforming vectors used for receiving.

In one embodiment, the third information is a DCI.

In one embodiment, the third information is transmitted on the PDCCH.

In one embodiment, the third information is carried in the second radio signal.

In one embodiment, one of the candidate scheme for the multi-antenna related receiving corresponding to the G multicarrier symbols is carried by the second radio signal.

In one embodiment, the third information is a high-layer signaling.

In one embodiment, the third information is an RRC signaling.

In one embodiment, the third information is used for determining the multi-antenna related receiving corresponding to the second radio signal.

In one embodiment, the third information indicates explicitly the multi-antenna related receiving corresponding to the second radio signal.

In one embodiment, the third information indicates implicitly the multi-antenna related receiving corresponding to the second radio signal.

The present disclosure discloses a method in a base station device used for wireless communication. The method includes the following steps:

transmitting a first radio signal.

Herein, the first radio signal is transmitted within a first time unit, a first bit block is used for generating the first radio signal, and the first radio signal includes G multicarrier symbols. As for any one given multicarrier symbol of the G multicarrier symbols, the multi-antenna related receiving for the given multicarrier symbol is related to the relative position of a time-domain resource occupied by the given multicarrier symbol with respect to a first time point in time domain. The first time point is one time point within the first time unit. G is a positive integer.

According to one aspect of the present disclosure, the method includes the following steps:

transmitting a second radio signal.

The second radio signal is transmitted within the first time unit, and the second radio signal is used for determining a time-domain resource occupied by the G multicarrier symbols.

According to one aspect of the present disclosure, if the time-domain resource occupied by the given multicarrier symbol is behind the first time point, the second radio signal is used for determining the multi-antenna related receiving for the given multicarrier symbol; or, if the time-domain resource occupied by the given multicarrier symbol is before the first time point, the multi-antenna related receiving for the given multicarrier symbol is related to the multi-antenna related receiving for the second radio signal.

According to one aspect of the present disclosure, the multi-antenna related receiving refers to a corresponding beamforming vector used for receiving; or, the multi-antenna related receiving refers to a corresponding antenna port used for transmitting.

According to one aspect of the present disclosure, the method includes the following steps:

transmitting first information.

The first information is used for determining the first time point.

According to one aspect of the present disclosure, the method includes the following steps:

receiving second information.

The second information is used for determining the first time point.

According to one aspect of the present disclosure, the method includes the following steps:

transmitting third information.

The third information is used for determining a candidate scheme for the multi-antenna related receiving corresponding to the G multicarrier symbols.

The present disclosure discloses a UE used for wireless communication. The UE includes:

a first transceiver module, to receive a first radio signal.

Herein, the first radio signal is transmitted within a first time unit, a first bit block is used for generating the first radio signal, and the first radio signal includes G multicarrier symbols. As for any one given multicarrier symbol of the G multicarrier symbols, the multi-antenna related receiving for the given multicarrier symbol is related to the relative position of a time-domain resource occupied by the given multicarrier symbol with respect to a first time point in time domain. The first time point is one time point within the first time unit. G is a positive integer.

In one embodiment, the above UE is characterized in that the first transceiver module is further configured to receive a second radio signal, the second radio signal is transmitted within the first time unit, and the second radio signal is used for determining a time-domain resource occupied by the G multicarrier symbols.

In one embodiment, the above UE is characterized in that if the time-domain resource occupied by the given multicarrier symbol is behind the first time point, the second radio signal is used for determining the multi-antenna related receiving for the given multicarrier symbol; or, if the time-domain resource occupied by the given multicarrier symbol is before the first time point, the multi-antenna related receiving for the given multicarrier symbol is related to the multi-antenna related receiving for the second radio signal.

In one embodiment, the above UE is characterized in that the multi-antenna related receiving refers to a corresponding beamforming vector used for receiving; or, the multi-antenna related receiving refers to a corresponding antenna port used for transmitting.

In one embodiment, the above UE is characterized in that the first transceiver module is further configured to receive first information, the first information being used for determining the first time point.

In one embodiment, the above UE is characterized in that the first transceiver module is further configured to transmit second information, the second information being used for determining the first time point.

In one embodiment, the above UE is characterized in that the first transceiver module is further configured to receive third information, the third information being used for determining a candidate scheme for the multi-antenna related receiving corresponding to the G multicarrier symbols.

The present disclosure discloses a base station device used for wireless communication. The base station device includes:

a second transceiver module, to transmit a first radio signal.

Herein, the first radio signal is transmitted within a first time unit, a first bit block is used for generating the first radio signal, and the first radio signal includes G multicarrier symbols. As for any one given multicarrier symbol of the G multicarrier symbols, the multi-antenna related receiving for the given multicarrier symbol is related to the relative position of a time-domain resource occupied by the given multicarrier symbol with respect to a first time point in time domain. The first time point is one time point within the first time unit. G is a positive integer.

In one embodiment, the above base station device is characterized in that the second transceiver module is further configured to transmit a second radio signal, the second radio signal is transmitted within the first time unit, and the second radio signal is used for determining a time-domain resource occupied by the G multicarrier symbols.

In one embodiment, the above base station device is characterized in that if the time-domain resource occupied by the given multicarrier symbol is behind the first time point, the second radio signal is used for determining the multi-antenna related receiving for the given multicarrier symbol; or, if the time-domain resource occupied by the given multicarrier symbol is before the first time point, the multi-antenna related receiving for the given multicarrier symbol is related to the multi-antenna related receiving for the second radio signal.

In one embodiment, the above base station device is characterized in that the multi-antenna related receiving refers to a corresponding beamforming vector used for receiving; or, the multi-antenna related receiving refers to a corresponding antenna port used for transmitting.

In one embodiment, the above base station device is characterized in that the second transceiver module is further configured to transmit first information, the first information being used for determining the first time point.

In one embodiment, the above base station device is characterized in that the second transceiver module is further configured to receive second information, the second information being used for determining the first time point.

In one embodiment, the above base station device is characterized in that the second transceiver module is further configured to transmit third information, the third information being used for determining a candidate scheme for the multi-antenna related receiving corresponding to the G multicarrier symbols.

In one embodiment, compared with traditional schemes, the present disclosure has the following advantages:

the dynamic of the multi-antenna related receiving is increased;

the overhead of control signaling is saved;

the dynamic of scheduling is increased; and the gain of transmission is improved.

BRIEF DESCRIPTION OF THE DRAWINGS

Other features, purposes and advantages of the present disclosure will become more apparent from the detailed description of non-restrictive embodiments taken in conjunction with the following drawings.

DESCRIPTION OF THE EMBODIMENTS

Embodiment 1

Figure 1:
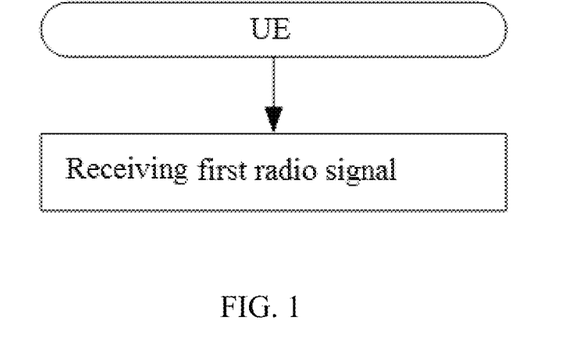
FIG. 1 is a flowchart illustrating a first radio signal according to one embodiment of the present disclosure.

Embodiment 1 illustrates an example of a flowchart of a first radio signal, as shown in FIG. 1.

In Embodiment 1, the UE in the present disclosure receives a first radio signal; the first radio signal is transmitted within a first time unit, a first bit block is used for generating the first radio signal, and the first radio signal includes G multicarrier symbols. As for any one given multicarrier symbol of the G multicarrier symbols, the multi-antenna related receiving for the given multicarrier symbol is related to the relative position of a time-domain resource occupied by the given multicarrier symbol with respect to a first time point in time domain. The first time point is one time point within the first time unit. G is a positive integer.

In one embodiment, the UE receives a second radio signal; the second radio signal is transmitted within the first time unit, and the second radio signal is used for determining a time-domain resource occupied by the G multicarrier symbols.

In one embodiment, if the time-domain resource occupied by the given multicarrier symbol is behind the first time point, the second radio signal is used for determining the multi-antenna related receiving for the given multicarrier symbol; or, if the time-domain resource occupied by the given multicarrier symbol is before the first time point, the multi-antenna related receiving for the given multicarrier symbol is related to the multi-antenna related receiving for the second radio signal.

In one embodiment, the UE receives first information, and the first information is used for determining the first time point.

In one embodiment, the UE transmits second information, and the second information is used for determining the first time point.

In one embodiment, the UE receives third information, and the third information is used for determining a candidate scheme for the multi-antenna related receiving corresponding to the G multicarrier symbols.

Embodiment 2

Figure 2:
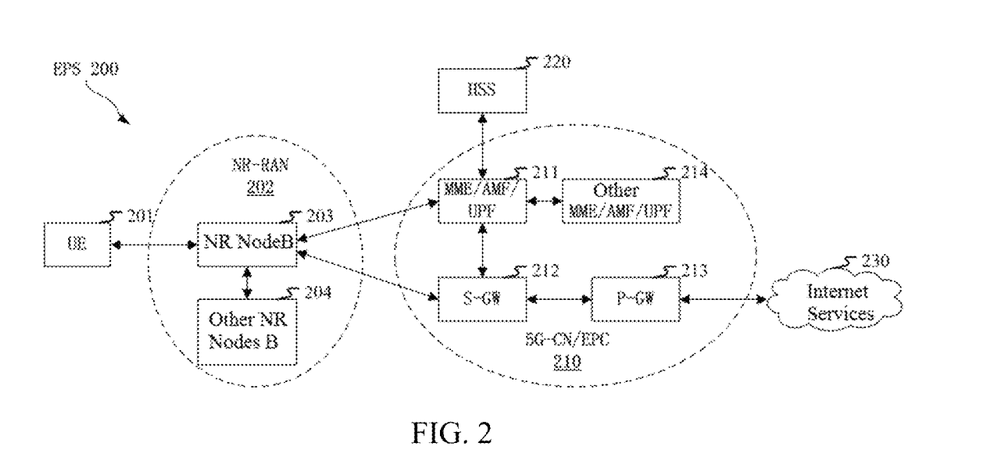
FIG. 2 is a diagram illustrating a network architecture according to one embodiment of the present disclosure.

Embodiment 2 illustrates an example of a diagram for a network architecture, as shown in FIG. 2.

Embodiment 2 illustrates an example of a diagram for a network architecture according to the present disclosure, as shown in FIG. 2. FIG. 2 is a diagram illustrating a system network architecture 200 of NR 5G, LTE and Long-Term Evolution Advanced (LTE-A). The NR 5G or LTE network architecture 200 may be called an Evolved Packet System (EPS) 200 or other appropriate terms. The EPS 200 may include one or more UEs 201, a Next Generation-Radio Access Network (NG-RAN) 202, a 5G-Core Network/Evolved Packet Core (5G-CN/EPC) 210, a Home Subscriber Server (HSS) 220 and an Internet Service 230. The EPS may be interconnected with other access networks. For simple description, the entities/interfaces are not shown. As shown in FIG. 2, the EPS provides packet switching services. Those skilled in the art are easy to understand that various concepts presented throughout the present disclosure can be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a TRP or other appropriate terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistants (PDAs), Satellite Radios, non-ground base station communications, satellite mobile communications, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user agent, a mobile client, a client or other appropriate terms. The gNB 203 is connected to the 5G-CN/EPC 210 via an S1/NG interface. The 5G-CN/EPC 210 includes a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the 5G-CN/EPC 210. Generally, the MME/AMF/UPF 211 provides bearer and connection management. All user Internet Protocol (IP) packets are transmitted through the S-GW 212. The S-GW 212 itself is connected to the P-GW 213. The P-GW 213 provides UE IP address allocation and other functions. The P-GW 213 is connected to the internet service 230. The internet service 230 includes IP services corresponding to operators, specifically including internet, intranet, IP Multimedia Subsystems (IP IMSs) and PS Streaming Services (PSSs).

In one embodiment, the UE 201 corresponds to the UE in the present disclosure.

In one embodiment, the UE 201 corresponds to the terminal in the present disclosure.

In one embodiment, the gNB 203 corresponds to the base station in the present disclosure.

In one embodiment, the UE 201 supports conducting wireless communication of data transmission on an unauthorized spectrum.

In one embodiment, the gNB 203 supports conducting wireless communication of data transmission on an unauthorized spectrum.

In one embodiment, the UE 201 supports Non-Orthogonal Multiple Access (NOMA) based wireless communication.

In one embodiment, the gNB 203 supports Non-Orthogonal Multiple Access (NOMA) based wireless communication.

In one embodiment, the UE 201 supports Gran-Free uplink transmission.

In one embodiment, the gNB 203 supports Gran-Free uplink transmission.

In one embodiment, the UE 201 supports competition based uplink transmission.

In one embodiment, the gNB 203 supports competition based uplink transmission.

In one embodiment, the UE 201 supports beamforming based uplink transmission.

In one embodiment, the gNB 203 supports beamforming based uplink transmission.

In one embodiment, the UE 201 supports Massive-MIMO based uplink transmission.

In one embodiment, the gNB 203 supports Massive-MIMO based uplink transmission.

Embodiment 3

Figure 3:
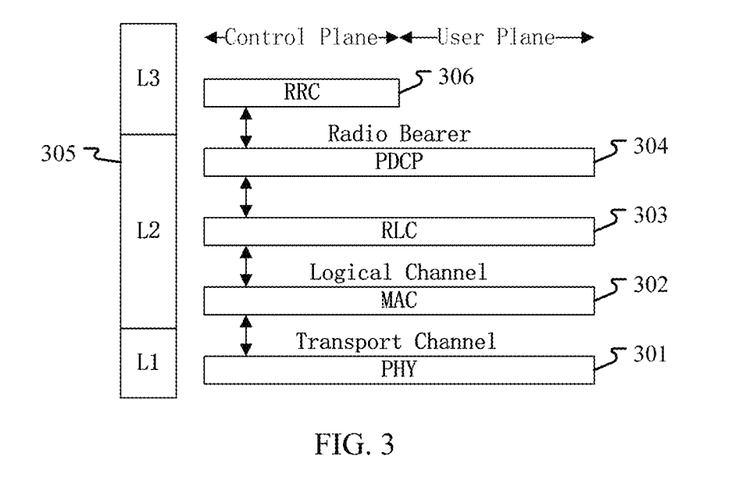
FIG. 3 is a diagram illustrating an embodiment of a radio protocol architecture of a user plane and a control plane according to one embodiment of the present disclosure.

Embodiment 3 is a diagram illustrating an embodiment of a radio protocol architecture of a user plane and a control plane according to the present disclosure, as shown in FIG. 3.

FIG. 3 is a diagram illustrating an embodiment of a radio protocol architecture of a user plane and a control plane. In FIG. 3, the radio protocol architecture of a UE and a base station device (gNB or eNB) is presented by three layers, which are a layer 1, a layer 2 and a layer 3 respectively. The layer 1 (L1) 301 is the lowest layer and performs signal processing functions of each PHY layer. Layers above the layer 1 belong to higher layers. The layer 1 is called PHY 301 in this paper. The layer 2 (L2) 305 is above the PHY 301, and is in charge of the link between the UE and the gNB via the PHY 301. In the user plane, the L2 305 includes a Medium Access Control (MAC) sublayer 302, a Radio Link Control (RLC) sublayer 303, and a Packet Data Convergence Protocol (PDCP) sublayer 304. All the three sublayers end at the gNB of the network side. Although not described in FIG. 3, the UE may include several higher layers above the L2 305, such as a network layer (i.e. IP layer) ending at a P-GW of the network side and an disclosure layer ending at the other side of the connection (i.e. a peer UE, a server, etc.). The PDCP sublayer 304 provides multiplexing among variable radio bearers and logical channels. The PDCP sublayer 304 also provides a header compression for a higher layer packet so as to reduce a radio transmission overhead. The PDCP sublayer 304 provides security by encrypting a packet and provides support for UE handover between gNBs. The RLC sublayer 303 provides segmentation and reassembling of a higher layer packet, retransmission of a lost packet, and reordering of a lost packet to as to compensate the disordered receiving caused by Hybrid Automatic Repeat Request (HARQ). The MAC sublayer 302 provides multiplexing between logical channels and transport channels. The MAC sublayer 302 is also responsible for allocating between UEs various radio resources (i.e., resource block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also includes a Radio Resource Control (RRC) sublayer 306 in the layer 3 (L3). The RRC sublayer 306 is responsible for acquiring radio resources (i.e. radio bearer) and configuring the lower layers using a RRC signaling between the gNB and the UE.

In one embodiment, the radio protocol architecture shown in FIG. 3 is applicable to the UE in the present disclosure.

In one embodiment, the radio protocol architecture shown in FIG. 3 is applicable to the base station in the present disclosure.

In one embodiment, the first radio signal in the present disclosure is generated by the PDCP sublayer 304.

In one embodiment, the second radio signal in the present disclosure is generated by the PHY 301.

In one embodiment, the first information in the present disclosure is generated by the PDCP PHY 301.

In one embodiment, the second information in the present disclosure is generated by the RRC sublayer 306.

In one embodiment, the third information in the present disclosure is generated by the RRC sublayer 306.

Embodiment 4

Figure 4:
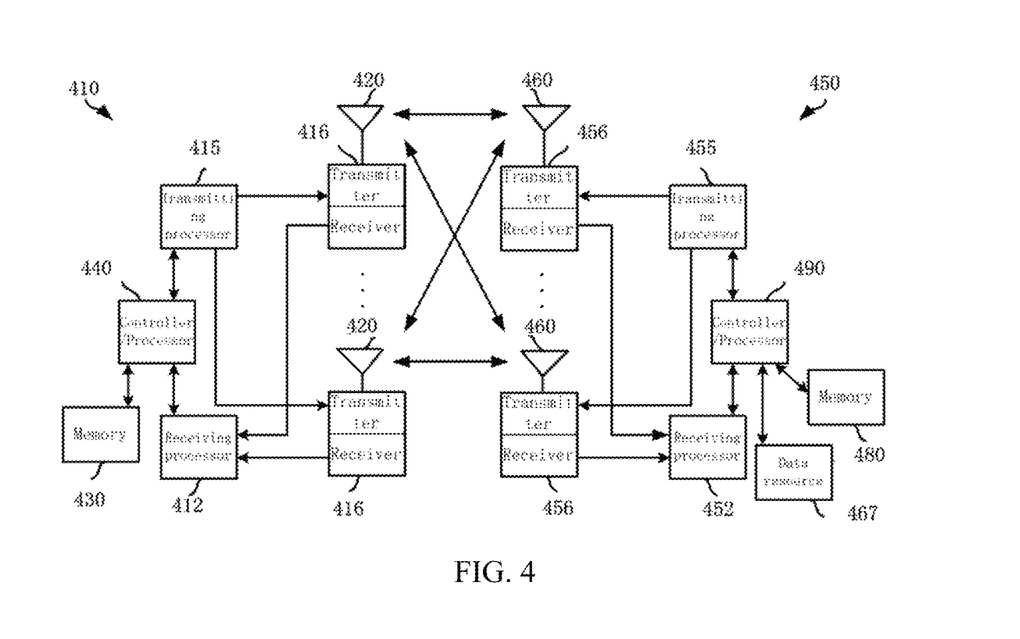
FIG. 4 is a diagram illustrating an evolved node B and a UE according to one embodiment of the present disclosure.

Embodiment 4 illustrates a diagram of a base station device and a UE according to the present disclosure, as shown in FIG. 4. FIG. 4 is a block diagram of a gNB 410 in communication with a UE 450 in an access network.

The base station device 410 includes a controller/processor 440, a memory 430, a receiving processor 412, a transmitting processor 415, a transmitter/receiver 416 and an antenna 420.

The UE 450 includes a controller/processor 490, a memory 480, a data source 467, a transmitting processor 455, a receiving processor 452, a transmitter/receiver 456 and an antenna 460.

In uplink transmission, processes relevant to the base station device 410 include the following.

The receiver 416 receives a radio-frequency signal through the corresponding antenna 420, converts the received radio-frequency signal into a baseband signal, and provides the baseband signal to the receiving processor 412.

The receiving processor 412 performs signal receiving processing functions of an L1 layer (that is, PHY), such as multi-antenna receiving, demodulation, descrambling, despreading, de-interleaving, channel decoding, extraction of physical layer control signal, etc.

The controller/processor 440 performs operations of an L2 layer, and is connected to the memory 43 that stores program code and data.

The controller/processor 440 provides multiplexing between a transport channel and a logical channel, packet reassembling, decryption, header decompression, and control signaling processing so as to recover a higher-layer packet coming from the UE 450. The higher-layer packet from the controller/processor 440 is then provided to a core network.

The controller/processor 440 determines a target aerial resource probably occupied by a target uplink radio signal, and sends the result to the receiving processor 412; and determines through blind detection whether the target uplink radio signal occupies the target aerial resource.

In UL transmission, processes relevant to the UE 450 include the following.

The data source 467 provides a higher-layer packet to the controller/processor 490. The data source 467 expresses all protocol layers above the L2 layer.

The transmitter 456 transmits a radio-frequency signal through the corresponding antenna 460, converts a baseband signal into a radio-frequency signal and provides the radio-frequency signal to the corresponding antenna 460.

The transmitting processor 455 performs signal receiving processing functions of the L1 layer (that is, PHY), including encoding, scrambling, code division multiplexing, interleaving, modulation, multi-antenna transmitting, etc.

The controller/processor 490 performs header compression, encryption, packet segmentation and reordering, and multiplexing between a logical channel and a transport channel based on the radio resource allocation of the gNB 410, and performs functions of the layer 2 of the user plane and the control plane.

The controller/processor 490 is also in charge of HARQ operation, retransmission of a lost packet, and the signaling to the eNB 410.

The controller/processor 490 determines itself the radio resource occupied by the radio signal and sends the result to the transmitting processor 455.

In Downlink (DL) transmission, processes relevant to the base station device 410 include the following.

A packet from a higher layer is provided to the controller/processor 440. The controller/processor 440 provides header compression, encryption, packet segmentation and reordering, multiplexing and de-multiplexing between a logical channel and a transport channel, to implement the L2 protocol used for the user plane and the control plane. The packet from a higher layer may include data or control information, for example, Downlink Shared Channel (DL-SCH).

The controller/processor 440 is connected to a memory 430 that stores program code and data. The memory 430 is computer readable.

The controller/processor 440 includes a scheduling unit used for transmission requirements. The scheduling unit is configured to schedule aerial resources corresponding to transmission requirements.

The controller/processor 440 determines downlink signaling/data to be transmitted, and sends the result to the transmitting processor 415.

The transmitting processor 415 receives a bit stream output from the controller/processor 440, and performs signal transmitting processing functions of an L1 layer (that is, PHY), including encoding, interleaving, scrambling, modulation, precoding, power control/allocation, generation of physical layer control signaling (including PBCH, PDCCH, PHICH, PCFICH, reference signal), etc.

The transmitter 416 is configured to convert the baseband signal provided by the transmitting processor 415 into a radio-frequency signal and transmit the radio-frequency signal via the antenna 420. Each transmitter 416 performs sampling processing on respective input symbol streams to obtain respective sampled signal streams. Each transmitter 416 performs further processing (for example, digital-to-analogue conversion, amplification, filtering, up conversion, etc.) on respective sampled streams to obtain a downlink signal.

In DL transmission, processes relevant to the UE 450 include the following.

The receiver 456 is configured to convert a radio-frequency signal received via the antenna 460 into a baseband signal and provide the baseband signal to the receiving processor 452.

The receiving processor 452 performs signal receiving processing functions of an L1 layer (that is, PHY), including multi-antenna receiving, demodulation, descrambling, de-interleaving, decoding, extraction of physical layer control signaling, etc.

The controller/processor 490 receives a bit stream output from the receiving processor 452, and provides header decompression, decryption, packet segmentation and reordering, multiplexing and de-multiplexing between a logical channel and a transport channel, to implement the L2 protocol used for the user plane and the control plane.

The controller/processor 490 is connected to a memory 480 that stores program code and data. The memory 480 is computer readable.

In one embodiment, the UE 450 device includes at least one processor and at least one memory. The at least one memory includes computer program codes. The at least one memory and the computer program codes are configured to be used in collaboration with the at least one processor. The UE 450 device at least receives a first radio signal, wherein the first radio signal is transmitted within a first time unit, a first bit block is used for generating the first radio signal, and the first radio signal includes G multicarrier symbols; as for any one given multicarrier symbol of the G multicarrier symbols, the multi-antenna related receiving for the given multicarrier symbol is related to the relative position of a time-domain resource occupied by the given multicarrier symbol with respect to a first time point in time domain; the first time point is one time point within the first time unit; and G is a positive integer.

In one embodiment, the UE 450 includes a memory that stores a computer readable instruction program. The computer readable instruction program generates an action when executed by at least one processor. The action includes receiving a first radio signal, wherein the first radio signal is transmitted within a first time unit, a first bit block is used for generating the first radio signal, and the first radio signal includes G multicarrier symbols; as for any one given multicarrier symbol of the G multicarrier symbols, the multi-antenna related receiving for the given multicarrier symbol is related to the relative position of a time-domain resource occupied by the given multicarrier symbol with respect to a first time point in time domain; the first time point is one time point within the first time unit; and G is a positive integer.

In one embodiment, the gNB 410 device includes at least one processor and at least one memory. The at least one memory includes computer program codes. The at least one memory and the computer program codes are configured to be used in collaboration with the at least one processor. The gNB 410 device at least transmits a first radio signal, wherein the first radio signal is transmitted within a first time unit, a first bit block is used for generating the first radio signal, and the first radio signal includes G multicarrier symbols; as for any one given multicarrier symbol of the G multicarrier symbols, the multi-antenna related receiving for the given multicarrier symbol is related to the relative position of a time-domain resource occupied by the given multicarrier symbol with respect to a first time point in time domain; the first time point is one time point within the first time unit; and G is a positive integer.

In one embodiment, the gNB 410 includes a memory that stores a computer readable instruction program. The computer readable instruction program generates an action when executed by at least one processor. The action includes transmitting a first radio signal, wherein the first radio signal is transmitted within a first time unit, a first bit block is used for generating the first radio signal, and the first radio signal includes G multicarrier symbols; as for any one given multicarrier symbol of the G multicarrier symbols, the multi-antenna related receiving for the given multicarrier symbol is related to the relative position of a time-domain resource occupied by the given multicarrier symbol with respect to a first time point in time domain; the first time point is one time point within the first time unit; and G is a positive integer.

In one embodiment, the UE 450 corresponds to the UE in the present disclosure.

In one embodiment, the gNB 410 corresponds to the base station in the present disclosure.

In one embodiment, at least the former two of the antenna 460, the receiver 456, the receiving processor 452, and the controller/processor 490 are configured to receive the first radio signal in the present disclosure.

In one embodiment, at least the former two of the antenna 460, the receiver 456, the receiving processor 452, and the controller/processor 490 are configured to receive the second radio signal in the present disclosure.

In one embodiment, at least the former two of the antenna 460, the receiver 456, the receiving processor 452, and the controller/processor 490 are configured to receive the first information in the present disclosure.

In one embodiment, at least the former two of the antenna 460, the receiver 456, the receiving processor 452, and the controller/processor 490 are configured to transmit the second information in the present disclosure.

In one embodiment, at least the former two of the antenna 460, the receiver 456, the receiving processor 452, and the controller/processor 490 are configured to receive the third information in the present disclosure.

In one subembodiment, at least the former two of the antenna 420, the transmitter 416, the transmitting processor 415, and the controller/processor 440 are configured to transmit the first radio signal in the present disclosure.

In one subembodiment, at least the former two of the antenna 420, the transmitter 416, the transmitting processor 415, and the controller/processor 440 are configured to transmit the second radio signal in the present disclosure.

In one subembodiment, at least the former two of the antenna 420, the transmitter 416, the transmitting processor 415, and the controller/processor 440 are configured to transmit the first information in the present disclosure.

In one subembodiment, at least the former two of the antenna 420, the transmitter 416, the transmitting processor 415, and the controller/processor 440 are configured to receive second first information in the present disclosure.

In one subembodiment, at least the former two of the antenna 420, the transmitter 416, the transmitting processor 415, and the controller/processor 440 are configured to transmit the third information in the present disclosure.

Embodiment 5

Figure 5:
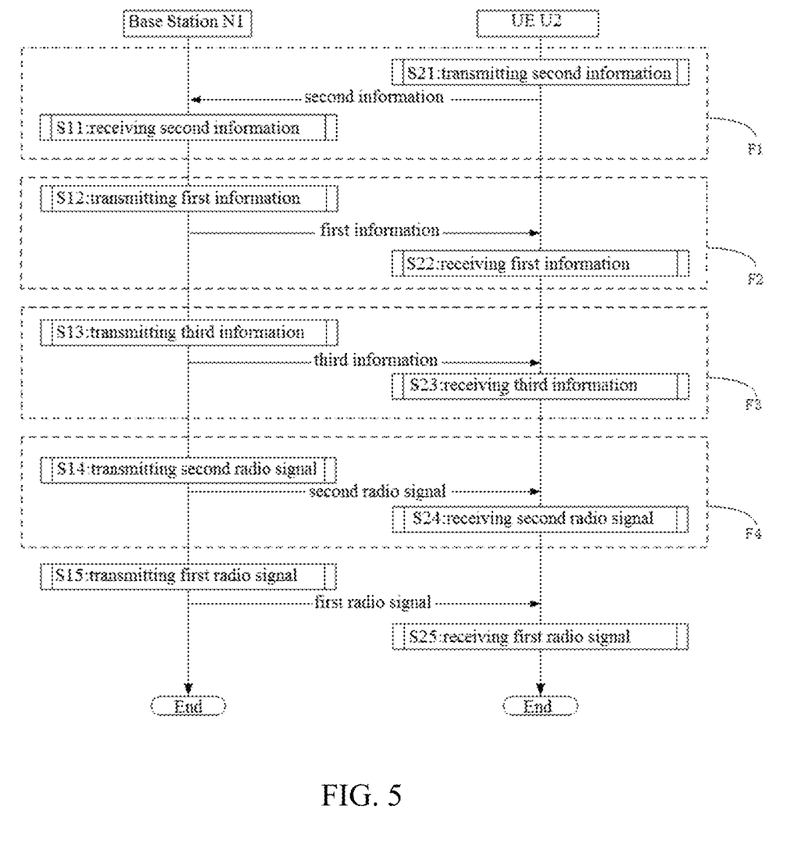
FIG. 5 is a flowchart illustrating wireless transmission according to one embodiment of the present disclosure.

Embodiment 5 illustrates an example of a flowchart of wireless transmission, as shown in FIG. 5. In FIG. 5, the base station N1 is a maintenance base station for a serving cell of the UE U2. In FIG. 5, steps in box F1, box F2, box F3 and box F4 are optional respectively.

The N1 receives second information in S11, transmits first information in S12, transmits third information in S13, transmits a second radio signal in S14, and transmits a first radio signal in S15.

The U2 transmits the second information in S21, receives the first information in S22, receives the third information in S23, receives the second radio signal in S24, and receives the first radio signal in S25.

In embodiment 5, the N1 transmits the first radio signal in a first time unit, a first bit block is used by the N1 to generate the first radio signal, and the first radio signal includes G multicarrier symbols. As for any one given multicarrier symbol of the G multicarrier symbols, the multi-antenna related receiving for the given multicarrier symbol by the U2 is related to the relative position of a time-domain resource occupied by the given multicarrier symbol with respect to a first time point in time domain. The first time point is one time point within the first time unit. G is a positive integer.

In one subembodiment, the step in the box F4 exists, the N1 transmits the second radio signal in the first time unit, and the second radio signal is used by the U2 to determine a time-domain resource occupied by the G multicarrier symbols.

In one subembodiment, if the time-domain resource occupied by the given multicarrier symbol is behind the first time point, the second radio signal is used by the U2 to determine the multi-antenna related receiving for the given multicarrier symbol.

In one subembodiment, if the time-domain resource occupied by the given multicarrier symbol is before the first time point, the multi-antenna related receiving for the given multicarrier symbol by the U2 is related to the multi-antenna related receiving for the second radio signal.

In one subembodiment, the multi-antenna related receiving refers to a beamforming vector used for receiving corresponding to the U2.

In one subembodiment, the multi-antenna related receiving refers to an antenna port used for transmitting corresponding to N1.

In one subembodiment, the step in the box F2 exists, the first information is used by the U2 to determine the first time point.

In one subembodiment, the step in the box F1 exists, the second information is used by the N1 to determine the first time point.

In one subembodiment, the step in the box F3 exists, the third information is used by the U2 to determine a candidate scheme for the multi-antenna related receiving corresponding to the G multicarrier symbols.

If there is no conflict, the above subembodiments can be arbitrarily combined.

Embodiment 6

Figure 6:
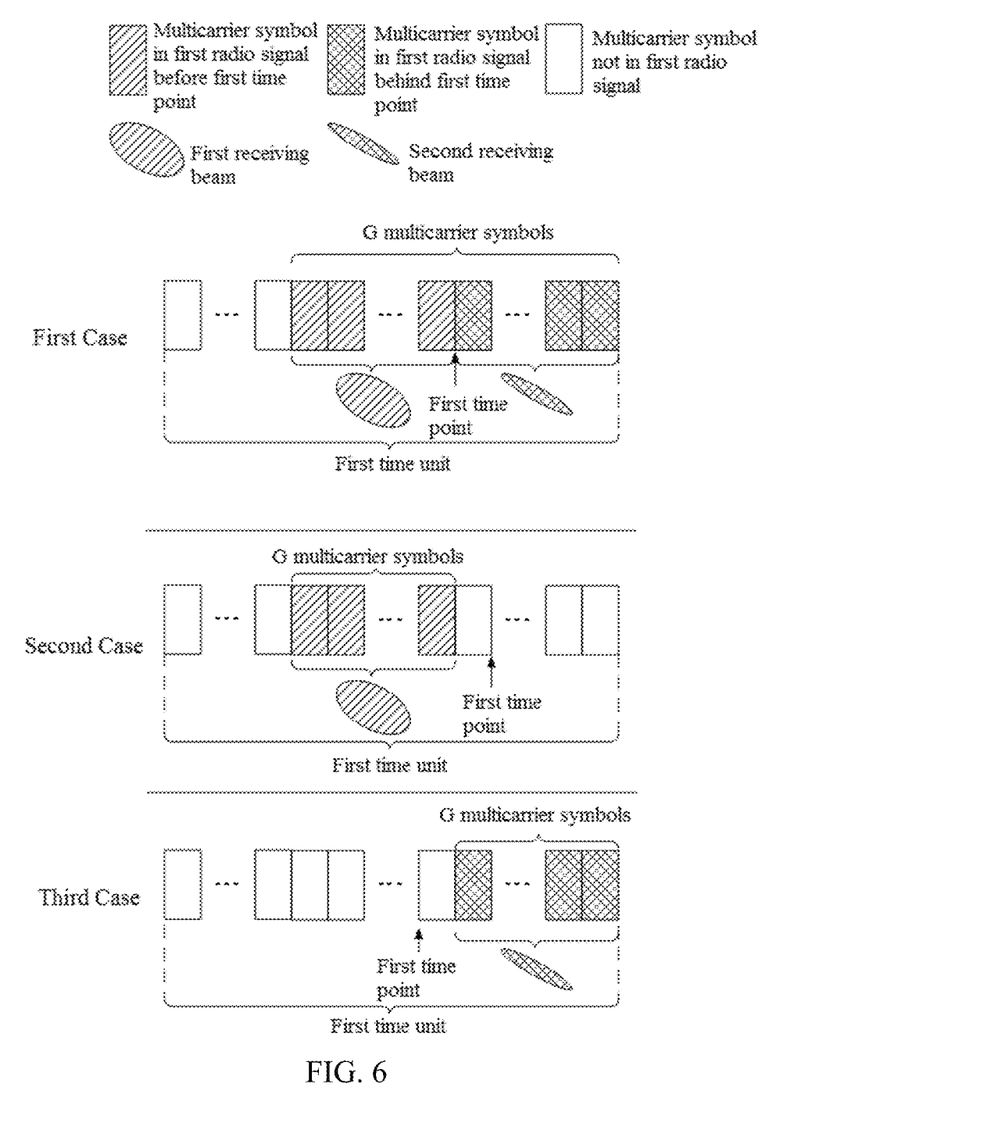
FIG. 6 is a diagram illustrating a first radio signal according to one embodiment of the present disclosure.

Embodiment 6 illustrates an example of a first radio signal, as shown in FIG. 6. In FIG. 6, rectangles filled by oblique lines represent multicarrier symbols in the first radio signal before the first time point, rectangles filled by cross lines represent multicarrier symbols in the first radio signal behind the first time point, blank rectangles represent multicarrier symbols not in the first radio signal, a wide oval filled by oblique lines represents a first receiving beam, and a narrow oval filled by cross lines represents a second receiving beam.

In Embodiment 6, the first radio signal consists of G multicarrier symbols, the first time unit includes the G multicarrier symbols, the first time point is one time point within the first time unit, and the relative position of the first radio signal with respect to the first time point in time domain includes the three cases shown in FIG. 6.

In the first case of Embodiment 6, the first time point is one time point in the time domain in which the G multicarrier symbols are located. The first receiving beam is used for receiving the multicarrier symbols in the first radio signal before the first time point. The second receiving beam is used for receiving the multicarrier symbols in the first radio signal behind the first time point.

In the second case of Embodiment 6, the first time point is behind the G multicarrier symbols, and the first receiving beam is used for receiving the G multicarrier symbols.

In the third case of Embodiment 6, the first time point is before the G multicarrier symbols, and the second receiving beam is used for receiving the G multicarrier symbols.

In one subembodiment, the time unit is a subframe.

In one subembodiment, the time unit is a time slot.

In one subembodiment, the second radio signal is a multicarrier symbol in which the PDSCH is located.

In one subembodiment, different beamforming vectors are used for forming the first receiving beam and the second receiving beam.

In one subembodiment, the first receiving beam has a beam width greater than that of the second receiving beam.

Embodiment 7

Figure 7:
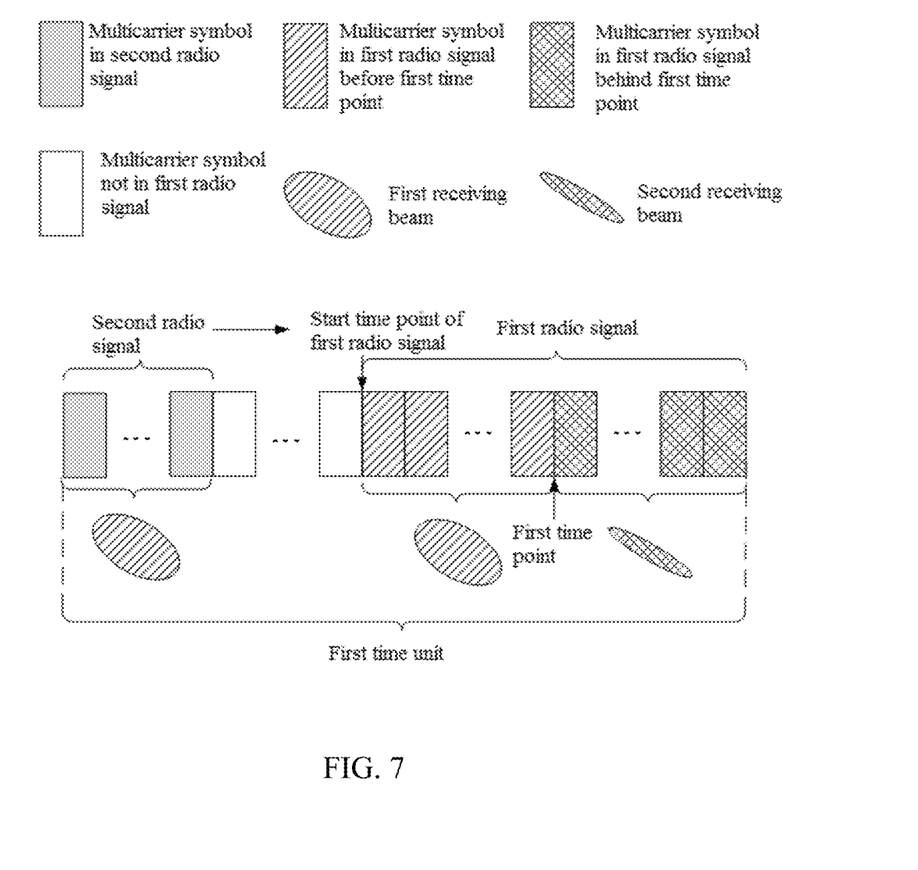
FIG. 7 is a diagram illustrating a second radio signal and a first radio signal according to one embodiment of the present disclosure.

Embodiment 7 illustrates an example of a second radio signal and a first radio signal, as shown in FIG. 7. Grey rectangles represent multicarrier symbols in the second radio signal, rectangles filled by oblique lines represent multicarrier symbols in the first radio signal before the first time point, rectangles filled by cross lines represent multicarrier symbols in the first radio signal behind the first time point, blank rectangles represent multicarrier symbols not in the first radio signal, a wide oval filled by oblique lines represents a first receiving beam, and a narrow oval filled by cross lines represents a second receiving beam.

In Embodiment 7, both the first radio signal and the second radio signal are transmitted within the first time unit, the multicarrier symbols occupied by the second radio signal are before the multicarrier symbols occupied by the first radio signal in time domain, the first receiving beam is used for receiving the second radio signal, the second radio signal indicates the start time point of the first radio signal in the first time unit, and the start time point is used for determining the time domain resource occupied by the first radio signal in the first time unit. The first time point is one time point within the first time unit behind the multicarrier symbols occupied by the second radio signal.

In Embodiment 7, the first receiving beam is used for receiving the second radio signal and the multicarrier symbols of the first radio signal before the first time point, and the second receiving beam is used for receiving the multicarrier symbols of the first radio signal behind the first time point.

In one subembodiment, the second radio signal is a PDCCH, and the first radio signal is a PDSCH.

In one subembodiment, the second radio signal is a DCI that is used for indicating downlink assignment, and the first radio signal is a PDSCH transmitted on the downlink resource indicated by the second radio signal.

In one subembodiment, the second radio signal indicates the second receiving beam.

In one subembodiment, the signaling before the first time unit is used for indicating the first receiving beam.

Embodiment 8

Figure 8:
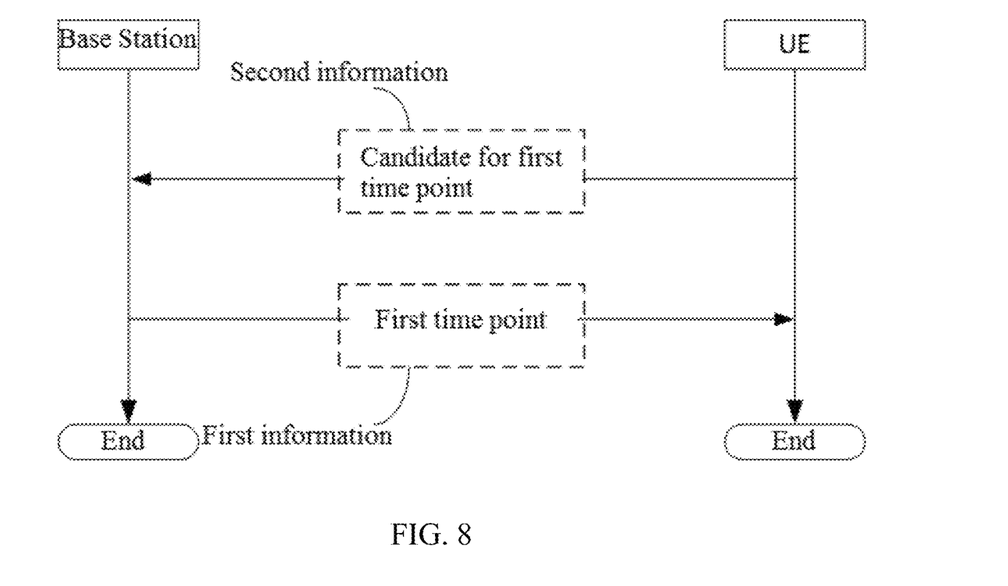
FIG. 8 is a diagram illustrating first information and second information according to one embodiment of the present disclosure.

Embodiment 8 illustrates an example of first information and second information, as shown in FIG. 8.

In Embodiment 8, the UE transmits to the base station the second information to recommend a candidate for the first time point, according to the processing capacity of the UE; and the base station transmits to the UE the first information to indicate the first time point, according to the processing capacity of the UE and the system situation. The first time point is one time point within the first time unit. The first time point is not earlier than the recommended candidate for the first time point in time domain. The first time point is used for determining the multi-antenna related receiving corresponding to the first radio signal in the first time unit. The first radio signal includes G multicarrier symbols. As for any one given multicarrier symbol of the G multicarrier symbols, the multi-antenna related receiving for the given multicarrier symbol is related to the relative position of the time-domain resource occupied by the given multicarrier symbol with respect to the first time point in time domain.

Embodiment 9

Figure 9:
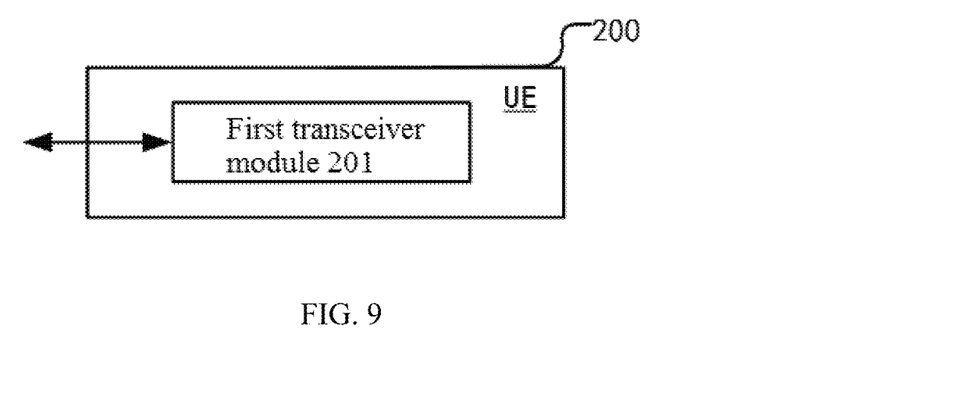
FIG. 9 is a structure block diagram illustrating a processing device used in a UE according to one embodiment of the present disclosure.

Embodiment 9 illustrates an example of a structure block diagram for a processing device used in a UE, as shown in FIG. 9. The UE device 200 is mainly composed of a first transceiver module 201.

In Embodiment 9, the first transceiver module 201 receives a first radio signal.

In embodiment 9, the first radio signal is transmitted within a first time unit, a first bit block is used for generating the first radio signal, and the first radio signal includes G multicarrier symbols. As for any one given multicarrier symbol of the G multicarrier symbols, the multi-antenna related receiving for the given multicarrier symbol is related to the relative position of a time-domain resource occupied by the given multicarrier symbol with respect to a first time point in time domain. The first time point is one time point within the first time unit. G is a positive integer.

In one embodiment, the first transceiver module 201 includes the receiver 456 and the receiving processor 452 mentioned in Embodiment 4.

In one embodiment, the first transceiver module 201 includes the transmitter 456 and the transmitting processor 455 mentioned in Embodiment 4.

In one embodiment, the first transceiver module 201 includes the antenna 460 mentioned in Embodiment 4.

In one embodiment, the first transceiver module 201 includes the controller/processor 490 mentioned in Embodiment 4.

In one embodiment, the first transceiver module 201 is further configured to receive a second radio signal; and the second radio signal is transmitted within the first time unit, and the second radio signal is used for determining a time-domain resource occupied by the G multicarrier symbols.

In one embodiment, if the time-domain resource occupied by the given multicarrier symbol is behind the first time point, the second radio signal is used for determining the multi-antenna related receiving for the given multicarrier symbol.

In one embodiment, if the time-domain resource occupied by the given multicarrier symbol is before the first time point, the multi-antenna related receiving for the given multicarrier symbol is related to the multi-antenna related receiving for the second radio signal.

In one embodiment, the multi-antenna related receiving refers to a corresponding beamforming vector used for receiving.

In one embodiment, the multi-antenna related receiving refers to a corresponding antenna port used for transmitting.

In one embodiment, the first transceiver module 201 is further configured to receive first information; and the first information is used for determining the first time point.

In one embodiment, the first transceiver module 201 is further configured to transmit second information; and the second information is used for determining the first time point.

In one embodiment, the first transceiver module 201 is further configured to receive third information; and the third information is used for determining a candidate scheme for the multi-antenna related receiving corresponding to the G multicarrier symbols.

Embodiment 10

Figure 10:
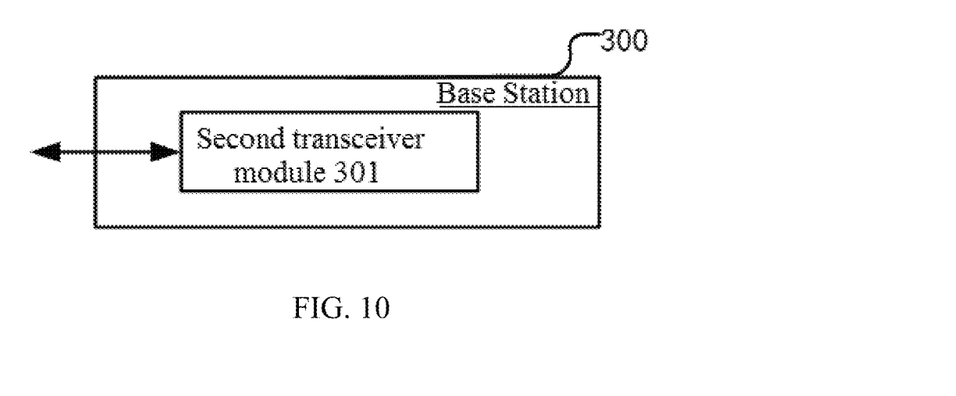
FIG. 10 is a structure block diagram illustrating a processing device used in a base station according to one embodiment of the present disclosure.

Embodiment 10 illustrates an example of a structure block diagram for a processing device used in a base station, as shown in FIG. 10. The base station device 300 is mainly composed of a second transceiver module 301.

In Embodiment 10, the second transceiver module 301 transmits a first radio signal.

In Embodiment 10, the first radio signal is transmitted within a first time unit, a first bit block is used for generating the first radio signal, and the first radio signal includes G multicarrier symbols. As for any one given multicarrier symbol of the G multicarrier symbols, the multi-antenna related receiving for the given multicarrier symbol is related to the relative position of a time-domain resource occupied by the given multicarrier symbol with respect to a first time point in time domain. The first time point is one time point within the first time unit. G is a positive integer.

In one embodiment, the second transceiver module 301 includes the transmitter 416 and the transmitting processor 415 mentioned in Embodiment 4.

In one embodiment, the second transceiver module 301 includes the receiver 416 and the receiving processor 412 mentioned in Embodiment 4.

In one embodiment, the second transceiver module 301 includes the receiver 416 and the transmitting processor 412 mentioned in Embodiment 4.

In one embodiment, the second transceiver module 301 includes the antenna 420 mentioned in Embodiment 4.

In one embodiment, the second transceiver module 301 is further configured to transmit a second radio signal; and the second radio signal is transmitted within the first time unit, and the second radio signal is used for determining a time-domain resource occupied by the G multicarrier symbols.

In one embodiment, if the time-domain resource occupied by the given multicarrier symbol is behind the first time point, the second radio signal is used for determining the multi-antenna related receiving for the given multicarrier symbol.

In one embodiment, if the time-domain resource occupied by the given multicarrier symbol is before the first time point, the multi-antenna related receiving for the given multicarrier symbol is related to the multi-antenna related receiving for the second radio signal.

In one embodiment, the multi-antenna related receiving refers to a corresponding beamforming vector used for receiving.

In one embodiment, the multi-antenna related receiving refers to a corresponding antenna port used for transmitting.

In one embodiment, the second transceiver module 301 is further configured to transmit first information, and the first information is used for determining the first time point.

In one embodiment, the second transceiver module 301 is further configured to receive second information, and the second information is used for determining the first time point.

In one embodiment, the second transceiver module 301 is further configured to transmit third information, and the third information is used for determining a candidate scheme for the multi-antenna related receiving corresponding to the G multicarrier symbols.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE or terminal in the present disclosure include but not limited to mobile phones, tablet computers, notebooks, network cards, NB-IOT terminals, eMTC terminal and other wireless communication equipment. The base station or system in the present disclosure includes but not limited to macro-cellular base stations, micro-cellular base stations, home base stations, relay base station and other wireless communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) for wireless communication, comprising:
   receiving a second radio signal;
   receiving a first radio signal;
   wherein the first radio signal is transmitted within a first time unit, a first bit block is used for generating the first radio signal, and the first radio signal comprises G multicarrier symbols; the second radio signal is transmitted within the first time unit, and the second radio signal is used for determining a time-domain resource occupied by the G multicarrier symbols; as for any one given multicarrier symbol of the G multicarrier symbols, the multi-antenna related receiving for the given multicarrier symbol is related to the relative position of a time-domain resource occupied by the given multicarrier symbol with respect to a first time point in time domain; when the time-domain resource occupied by the given multicarrier symbol is behind the first time point, the second radio signal is used for determining the multi-antenna related receiving for the given multicarrier symbol; and when the time-domain resource occupied by the given multicarrier symbol is before the first time point, the multi-antenna related receiving for the given multicarrier symbol is related to the multi-antenna related receiving for the second radio signal; the first time point is one time point within the first time unit; and G is a positive integer.

2. The method according to claim 1, comprising:
   receiving first information, wherein the first information is used for determining the first time point;
   or,
   receiving third information, wherein the third information is used for determining a candidate scheme for the multi-antenna related receiving corresponding to the G multicarrier symbols.

3. The method according to claim 2 comprising:
   transmitting second information, wherein the second information is used for determining the first time point.

4. The method according to claim 1 comprising:
   transmitting second information;
   wherein the second information is used for determining the first time point.

5. A method in a base station device for wireless communication, comprising:
   transmitting a second radio signal;
   transmitting a first radio signal;
   wherein the first radio signal is transmitted within a first time unit, a first bit block is used for generating the first radio signal, and the first radio signal comprises G multicarrier symbols; the second radio signal is transmitted within the first time unit, and the second radio signal is used for determining a time-domain resource occupied by the G multicarrier symbols; as for any one given multicarrier symbol of the G multicarrier symbols, the multi-antenna related receiving for the given multicarrier symbol is related to the relative position of a time-domain resource occupied by the given multicarrier symbol with respect to a first time point in time domain; when the time-domain resource occupied by the given multicarrier symbol is behind the first time point, the second radio signal is used to determine the multi-antenna related receiving for the given multicarrier symbol; and when the time-domain resource occupied by the given multicarrier symbol is before the first time point, the multi-antenna related receiving for the given multicarrier symbol is related to the multi-antenna related receiving for the second radio signal; the first time point is one time point within the first time unit; and G is a positive integer.

6. The method according to claim 5, comprising:
   transmitting first information, wherein the first information is used for determining the first time point;
   or,
   transmitting third information, wherein the third information is used for determining a candidate scheme for the multi-antenna related receiving corresponding to the G multicarrier symbols.

7. The method according to claim 6 comprising:
   receiving second information, wherein the second information is used for determining the first time point.

8. The method according to claim 5, comprising:
   receiving second information;
   wherein the second information is used for determining the first time point.

9. A UE for wireless communication, comprising:
   a first transceiver module, to receive a second radio signal and a first radio signal;
   wherein the first radio signal is transmitted within a first time unit, a first bit block is used for generating the first radio signal, and the first radio signal comprises G multicarrier symbols; the second radio signal is transmitted within the first time unit, and the second radio signal is used for determining a time-domain resource occupied by the G multicarrier symbols; as for any one given multicarrier symbol of the G multicarrier symbols, the multi-antenna related receiving for the given multicarrier symbol is related to the relative position of a time-domain resource occupied by the given multicarrier symbol with respect to a first time point in time domain; when the time-domain resource occupied by the given multicarrier symbol is behind the first time point, the second radio signal is used to determine the multi-antenna related receiving for the given multicarrier symbol; and when the time-domain resource occupied by the given multicarrier symbol is before the first time point, the multi-antenna related receiving for the given multicarrier symbol is related to the multi-antenna related receiving for the second radio signal; the first time point is one time point within the first time unit; and G is a positive integer.

10. The UE according to claim 9, wherein the first transceiver module receives first information, the first information being used for determining the first time point; or, the first transceiver module transmits second information, the second information being used for determining the first time point; or, the first transceiver module receives third information, the third information being used for determining a candidate scheme for the multi-antenna related receiving corresponding to the G multicarrier symbols.

11. A base station device for wireless communication, comprising:
    a second transceiver module, to transmit a second radio signal and a first radio signal;
    wherein the first radio signal is transmitted within a first time unit, a first bit block is used for generating the first radio signal, and the first radio signal comprises G multicarrier symbols; the second radio signal is transmitted within the first time unit, and the second radio signal is used for determining a time-domain resource occupied by the G multicarrier symbols; as for any one given multicarrier symbol of the G multicarrier symbols, the multi-antenna related receiving for the given multicarrier symbol is related to the relative position of a time-domain resource occupied by the given multicarrier symbol with respect to a first time point in time domain; when the time-domain resource occupied by the given multicarrier symbol is behind the first time point, the second radio signal is used to determine the multi-antenna related receiving for the given multicarrier symbol; and when the time-domain resource occupied by the given multicarrier symbol is before the first time point, the multi-antenna related receiving for the given multicarrier symbol is related to the multi-antenna related receiving for the second radio signal; the first time point is one time point within the first time unit; and G is a positive integer.

12. The base station device according to claim 11, wherein the second transceiver module transmits first information, the first information being used for determining the first time point; or, the second transceiver module receives second information, the second information being used for determining the first time point; or, the second transceiver module transmits third information, the third information being used for determining a candidate scheme for the multi-antenna related receiving corresponding to the G multicarrier symbols.

* * * * *